Patented Aug. 4, 1953

2,647,864

UNITED STATES PATENT OFFICE 2,647,864

ETCHING PROCESS

Daniel L. Goffredo, Easton, Pa.

No Drawing. Application May 29, 1952, Serial No. 290,821

5 Claims. (Cl. 204—17)

This invention relates to a new and improved method of making photoengraved plates.

Photoengraving processes generally involve the treatment of metallic plates having a light-sensitive, acid-resistant coating on one face. The desired image to be reproduced is transferred to the light-sensitive coating by exposing the coating to a strong light passing through a negative bearing the image. The portions of the coated surface affected by the light are rendered insoluble and the unaffected portions are washed off with a solvent.

The plate is then ready for etching which cuts the image into the plate in relief for use in printing or mat molding operations.

When making half-tone cuts, the etching is generally carried out so that the image projects above the etched surface of the plate from three to seven thousandths of an inch, while in the case of line cuts the image may project upwardly thirty thousandths of an inch. It has been found that these fine pin-point dots and the fine lines are undercut and destroyed in the etching process if their sides are not protected by an acid resist. It has therefore been the general practice to etch the plates in a series of etchings or bites. During the first bite the etching solution proceeds to a small depth below the surface of the plate. The plate is then rinsed of etchant, dried and the sides of the unetched areas are protected by carefully applying an acid-resistant powdered resin. The plate with the powdered resin against the edges of the unetched areas is placed on a heating element to permit the powder to melt and adhere to sides of half-tone dots or fine lines. Then another bite of the etchant is made. This procedure is repeated until the image projects the required distance from the etched surface of the plate.

From the foregoing it should be apparent that, even with highly skilled photoengravers, the time required to produce a quality printing plate is objectionably long.

It is therefore a principal object of the invention to provide a method of making photoengraved plates in a fraction of the time required by any known conventional process.

A further object is to provide a plate etching process wherein the conventional powdering step is entirely eliminated and an acid resistant material is automatically deposited from the etchant to protect the sides of the relief area.

Another object of the process of the invention is to provide means whereby the image size photomechanically placed on the plate is retained throughout the etching process.

A further object is to provide a method which eliminates multiple bites in the etching operation.

These and other objects and advantages are provided by the etching process of the invention which generally comprises forming a light-sensitive resist layer on the top member of a bimetallic plate, which top member consists of a metal lower in the electromotive force series of metals than the base member, removing the top member of the bimetallic plate under the non-resistant portions of the resist, and then etching the exposed portions of the base member of the plate with a relatively strong solution of a salt of the metal of the top portion, whereby metal is deposited from the etching solution and adheres to the edges of the etched pits and protects them from undercutting.

The invention will be more particularly described with reference to a bimetallic plate of copper on zinc.

The image to be reproduced is projected upon a light-sensitive acid-resistant coating on the copper surface, and the non-exposed portions of the coating are removed in the conventional manner of photoprinting on cold top, leaving uncoated copper over the portions of the plate to be etched. The copper in the exposed areas is then removed. The removal of the copper from the exposed areas may be accomplished by electrolytic or chemical methods. For example, the copper may be removed by electrically deplating in a cyanide bath or in an ammonium persulfate bath. A ferric chloride solution or a nitric acid solution may be used to dissolve the copper from the open areas in place of the deplating process. The primary requirement of either method is that the copper in the open areas be removed without affecting the copper under the acid resist and with minimum effect on the underlying zinc.

The plate is then ready to be etched with a copper sulfate solution which may be variously modified with oxidizers, abrasives and other additives as is more fully described hereinafter.

The copper sulfate solution is applied to the plate by means of an aspirating air blast. As the copper sulfate solution etches the exposed zinc in the plate, the zinc replaces the copper in solution leaving metallic copper deposited on the plate which is not attacked by the copper sulfate etchant. The primary deposition of the copper is on the edges of the copper surface of the bimetallic plate to protect the zinc at the exposed interface, and secondly on the sides of the relief areas protecting them from sideways etching action. The less adherent copper which tends to form in the bottoms of the etched areas is mechanically blasted off by the air stream.

It has been found that an aspirating air blast nozzle using air at about 30 pounds pressure to direct the etching solution against the plate gives very satisfactory results, and washes away substantially all the chemically deposited copper except at the sides of the relief areas in the highlight portions of the image while leaving increasing amounts of copper in the middletone and shadow portions of the image, thereby giving the desired increased depth of etch in the highlight portions. Variations in air pressure will cause changes in the configuration of the relief shoulders. Similarly the addition of abrasives to the etchant affects the rate of etching, the depths of etching that may be obtained in a given area, and the type of relief shoulder.

Abrasives which have been found to give satisfactory results include silica, silica coated lead, clay, and fine copper.

Where the deposit of copper from pure copper sulfate etching solution is found too adherent to the zinc, requiring excessive blasting pressure and large quantities of abrasives to remove it from the bottoms of the etched areas various additives may be included in the etchant to alter the physical properties of the copper deposit. It has been found that by the addition of oxidizing agents to the copper sulfate solution the displacement action of the copper sulfate on the zinc is accelerated and a relatively spongy copper is deposited. Oxidizers such as nitric acid, nitrate salts, or hydrogen peroxide have been found to give very satisfactory results.

Other additives which individually or in combination affect the physical characteristics of the copper chemically deposited, the tenacity of the deposited copper to the zinc and about the copper top of the plate, and the characteristics of the aspirator blast are colloids such as gelatin, detergents, and thickeners such as sodium carboxymethyl cellulose.

The following are formulas of suitable etchants for copper plated zinc plates:

*Example I*

300 gr. $CuSO_4 \cdot 5H_2O$ per liter of water
- Oxidizer:
  - 10 cc. conc. nitric acid
- Additive:
  - 10 cc. aerosol OT (aqueous dispersion of dioctyl sodium sulfosuccinate)
  - 10 grams sodium carboxymethyl cellulose
- Abrasive:
  - 10 grams of clay suspended in the solution

*Example II*

250 g. $CuSO_4 \cdot 5H_2O$+1 liter water
- Oxidizer:
  - 5 grams sodium nitrate
- Additive:
  - 0.5 cc. Renex (Atlas Powder Co.)
  - .02 g. gelatin

*Example III*

175 g. $CuSO_4 \cdot 5H_2O$+1 liter water
- Oxidizer:
  - 10 cc. 6% hydrogen peroxide
- Additive:
  - 1 gram sodium carboxymethyl cellulose

*Example IV*

200 g. $CuSO_4 \cdot 5H_2O$+1 liter water
- Oxidizer:
  - 5 cc. conc. nitric acid

*Example V*

200 g. $CuSO_4 \cdot 5H_2O$+1 liter water

From the foregoing description it will be be seen that the aims, objects and advantages of the invention are fully accomplished by the improved etching process of the invention.

While the invention has been primarily described with reference to etching copper-plated zinc plates with a modified copper sulfate solution it is apparent that other bimetallic plates may be employed within the scope of the invention. For example, metals that are electronegative toward zinc in the presence of copper sulfate solution may be used such as chromium, cadmium, lead, silver, or gold. However, the less reactive the metallic coating is to the oxidizing powers of the copper sulfate mixture, the less will be the image reduction during the etching process.

In processes employing the above disclosed metals, in place of the copper coating on the zinc plate, substantially the same etching procedure as described with reference to the copper-coated zinc plates may be used except for the initial stripping operation of the plated metal. For example, if chromium-coated zinc plates are used the chromium may be electrochemically removed from the non-resistant portions of the plate in a sodium hydroxide-sodium cyanide solution.

Where zinc-coated magnesium plates are used and etched with the copper sulfate mixture the zinc in the non-resistant portions of the plate need not be stripped before etching.

However, where the zinc, or the zinc-coated magnesium plate, is removed from the non-resistant areas with, for example, a dilute nitric acid solution the following etchants have been found to give very satisfactory results.

*Example VI*

200 g. zinc chloride
1 liter of water

*Example VII*

1 g. copper sulfate
200 g. zinc chloride
1.5 liters of water

*Example VIII*

300 ml. concentrated hydrochloric acid
1 liter of water
10 g. copper sulfate

Abrasives and additives disclosed in Examples I through III may be added to the specific echants of Examples VI through VIII.

Printing plates having two coatings of metal may also be employed in the process of the invention, and copper-plated, zinc-coated magnesium plates have given satisfactory results. The magnesium plate is first provided with a thin coating of zinc and then a coating of copper on the zinc. The coated plate may then be etched by the hereinbefore described method for etching copper-plated zinc plates.

I claim:

1. A method of making etched plates comprising forming a resist image on the top member of a bimetallic plate, which top member consists of a metal lower in the electromotive force series of metals than the base member, removing the top member of the bimetallic plate under the non-resistant portions of the resist, and then etching the exposed portions of the base member of the plate to produce a relief image with a solution of a salt of the metal of the top portion, whereby metal is deposited from the solution and adheres to the edges of the etched pits and protects them from undercutting.

2. A method of making etched plates comprising forming a resist image on a copper-plated zinc plate, removing the copper under the non-resistant portions of the plate and then etching the exposed portions of the plate to produce a relief image by a blast etch with a solution of copper sulfate containing an oxidizer whereby copper is deposited from the etching solution and adheres to the edges of the etched pits and protects them from undercutting.

3. The method of making etched plates as defined in claim 2 wherein the oxidizer is selected from the group consisting of nitric acid, sodium nitrate and hydrogen peroxide.

4. A method of making etched plates comprising forming a resist image on a copper-plated zinc plate, removing the copper under the non-resistant portions of the plate and then etching the exposed portions of the plate to produce a relief image by an air blast etch with a solution of copper sulfate containing an oxidizer and a suspended abrasive, whereby copper is deposited from the etching solution and adheres to the edges of the etched pits and protects them from undercutting.

5. A method of making etched plates comprising forming a resist image on a copper-plated zinc plate, removing the copper under the non-resistant portions of the plate and then etching the exposed portions of the plate to produce a relief image by an air blast etch with a solution of copper sulfate containing nitric acid, suspended clay, and a wetting agent, whereby copper is deposited from the etching solution and adheres to the edges of the etched pits and protects them from undercutting.

DANIEL L. GOFFREDO.

References Cited in the file of this patent

UNITED STATES PATENTS

| Number | Name | Date |
|---|---|---|
| 2,558,504 | Aller | June 26, 1951 |
| 2,584,317 | Aller | Feb. 5, 1952 |